United States Patent [19]

Greve et al.

[11] 4,087,244
[45] May 2, 1978

[54] DYEING AND PRINTING BASIC DYEABLE TEXTILE SUBSTRATES WITH BECATIONIC DISAZO AND TRISAZO DYES HAVING OPTIONALLY FURTHER SUBSTITUTED 6-HYDROXY-4-METHYL-3-N-PYRIDINIUM-PYRIDONE-2-COUPLING COMPONENT RADICALS

[75] Inventors: Manfred Greve, Allschwil; Helmut Moser, Reinach, both of Switzerland

[73] Assignee: Sandoz Ltd., Basle, Switzerland

[21] Appl. No.: 700,934

[22] Filed: Jun. 29, 1976

[30] Foreign Application Priority Data

Jun. 30, 1975 Switzerland .......................... 8466/75
Nov. 5, 1975 Switzerland ........................ 14261/75

[51] Int. Cl.² ...................... C09B 27/00; C09B 29/36
[52] U.S. Cl. ............................................. 8/41 R; 8/7;
8/41 A; 8/41 B; 8/41 C; 8/168 A; 8/168 AA;
8/168 B; 8/168 CA; 8/177 AB; 8/178 R; 8/178
E; 260/156; 260/169; 260/174
[58] Field of Search ...................... 8/41 R, 41 A, 41 B,
8/41 C, 168 A, 168 AA, 168 B, 168 CA, 168 C,
177 AB, 178 E; 260/156

[56] References Cited

U.S. PATENT DOCUMENTS 3,852,261  12/1974  Steinemann .......................... 260/156

FOREIGN PATENT DOCUMENTS 566,845  12/1958  Canada.
1,377,612  12/1974  United Kingdom ................. 260/156
1,437,204  5/1976  United Kingdom.
1,296,857  11/1972  United Kingdom.
1,297,116  11/1972  United Kingdom.

OTHER PUBLICATIONS

Bird, C. L. and Bostow, W. S., "The Theory of Coldration of Textiles" (Dyers Company Publications Trust) 1975, pp. 143–159.

*Primary Examiner*—A. Lionel Clingman
*Attorney, Agent, or Firm*—Gerald D. Sharkin; Richard E. Vila; Melvyn M. Kassenoff

[57] ABSTRACT

Disclosed are disazo and trisazo dyes free of sulfo groups which contain two 6-hydroxy-4-methyl-3-N-pyridiniumpyridone-2 coupling component radicals, preferably dyes of the formula

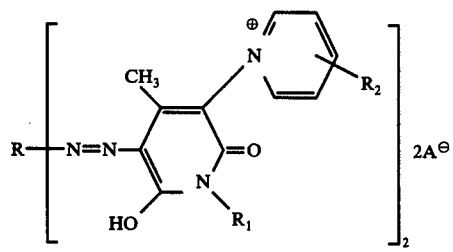

wherein
R is a tetrazo component radical,
each $R_1$ is independently hydrogen, $C_{1-4}$alkyl, $C_{1-4}$hydroxyalkyl or $-NR_3R_4$,
wherein each of $R_3$ and $R_4$ is independently n-$C_{1-4}$-alkyl,
each $R_2$ is independently hydrogen, n-$C_{1-4}$alkyl, n-$C_{1-4}$-hydroxyalkyl or $C_{1-4}$alkoxy, and
each $A^-$ is an anion.

The dyes are useful for dyeing paper and basically dyeable substrates such as polymers and copolymers of acrylonitrile and dicyanoethylene and synthetic polyesters and polyamides modified to contain acid groups. Dyeings on textiles are even and possess good light fastness.

18 Claims, No Drawings

DYEING AND PRINTING BASIC DYEABLE TEXTILE SUBSTRATES WITH BECATIONIC DISAZO AND TRISAZO DYES HAVING OPTIONALLY FURTHER SUBSTITUTED 6-HYDROXY-4-METHYL-3-N-PYRIDINIUMPYRIDONE-2-COUPLING COMPONENT RADICALS

The invention relates to azo compounds.

The invention provides bicationic dis- and tris-azo dyestuffs which are free from sulphonic acid groups and which contain terminal coupling components, said coupling components being 4-methyl-6-hydroxy-3N-pyridiniumpyridone-2 radicals, coupled at the 5-position of the pyridone ring.

The dyestuffs provided by the invention may be symmetrical or asymmetrical. The pyridone nitrogen may, for example, by unsubstituted (i.e. attached to a hydrogen atom) or substituted by alkyl (which may in turn be substituted) or by a tertiary amino group. The pyridinium group may also be substituted, e.g. by alkyl or alkoxy (which in turn may be substituted). The nature of any substituent is not critical provided it is compatible with azo basic dyestuff chemistry and the use of the compounds as basic dyes. Suitable substituents will readily occur to those skilled in the art.

Where the pyridone nitrogen is substituted, the preferred substituents are straight or branched $C_{1-4}$alkyls, unsubstituted or substituted by a hydroxy group (the hydroxy group, of course, being at least two carbon atoms removed from the nitrogen), and radicals of the formula $-NR_3R_4$, where $R_3$ and $R_4$, independently, are each straight chain $C_{1-4}$alkyl radicals. Where the pyridinium radical is substituted, the preferred substitutents are straight $C_{1-4}$alkyls, unsubstituted or substituted by a hydroxy radical, and $C_{1-4}$alkoxy radicals.

These preferred compounds may be represented by formula I,

I where
R is the radical of a tetrazotisable diamino compound,
$R_1$ is hydrogen; $C_{1-4}$alkyl, unsubstituted or substituted by a hydroxy group; or a radical $-NR_3R$, where $R_3$ and $R_4$, independently, are unsubstituted straight chain $C_{1-4}$alkyls, preferably both being methyl,
$R_2$ is hydrogen; straight chain $C_{1-4}$alkyl, unsubstituted or substituted by a hydroxy group; or $C_{1-4}$alkoxy, and
$A^-$ is an anion.

As will be appreciated, in the trisazo compounds R contains an azo linkage whereas in the disazo compounds R is free from such linkage.

R preferably has a significance of R', i.e. 1,4-phenylene, 2,7-fluorene or a radical (a)

or (b)

where
Z is bound meta or para to the free bonds and is a direct bond ($Z_1$), straight or branched $C_{1-6}$alkylene($Z_2$), $-CO-(Z_3)$, $-NHCSNH-(Z_4)$, $-S-(Z_5)$, $-O-(Z_6)$, $-CH=CH-(Z_7)$, $-S-S-(Z_8)$, $-SO_2-(Z_9)$, $-NH-(Z_{10})$, $-NH-CO-(Z_{11})$, $-NCH_3-CO-(Z_{12})$, $-C-(Z_{13})$, $-CO-NH-$⟨⟩$-NH-CO-(Z_{14})$,
  |
  H $-CO-NH-$⟨⟩$-x(Z_{15})$,
           |
           NHCO—

$-NH-CO-$⟨⟩$-CO-NH-(Z_{16})$, $-SO_2NH-(Z_{17})$, $-SO_2NH-$⟨⟩$-NH-SO_2-(Z_{18})$, $-NR_8-CO-(CH_2)_n-CO-NR_8-(Z_{19})$,
$-NR_8-CO-CH=CH-CO-NR_8-(Z_{20})$,
$-NR_8-CO-NR_8-(Z_{21})$,
$-CO-NH-NH-CO-(Z_{22})$,
$-CH_2-CO-NH-NH-CO-CH_2-(Z_{23})$,
$-CH=CH-CO-NH-NH-CO-CH=CH-(Z_{24})$, $-N\begin{smallmatrix}CH_2CH_2\\CH_2CH_2\end{smallmatrix}N-(Z_{25})$, $-O-CO-N\begin{smallmatrix}CH_2CH_2\\CH_2CH_2\end{smallmatrix}N-CO-O-(Z_{26})$, $-C\begin{smallmatrix}N---N\\O\end{smallmatrix}C-(Z_{27})$, $-O-CO-O-(Z_{28})$, $-CO-O-(Z_{29})$, $-CO-CO-(Z_{30})$, $-O-(CH_2)_n-O-(Z_{31})$, $-NR_8-C\begin{smallmatrix}N\\N\end{smallmatrix}C-NR_8-(Z_{32})$ or $-O-C\begin{smallmatrix}N\\N\end{smallmatrix}C-O-(Z_{33})$,
         ||         ||
         N          N
         |          |
         C          C
         |          |
         y          y in which
$n$ is 1, 2, 3 or 4, preferably 2 or 4,
$x$ is halogen, $C_{1-4}$alkyl or $C_{1-4}$alkoxy, and
$y$ is halogen (preferably chlorine), $-NHCH_2CH_2OH$ or $-N(CH_2CH_2OH)_2$, Zo is $Z_1$, above, —N=N-$(Z_{34})$, —$CH_2$-$(Z_{35})$ or —$CH_2CH_2$-$(Z_{36})$, $R_5$ is hydrogen, halogen, $C_{1-4}$alkyl or $C_{1-4}$-alkoxy, $R_6$ is halogen, $C_{1-4}$alkyl or $C_{1-4}$alkoxy, $R_7$ is hydrogen, $C_{1-4}$alkyl or $C_{1-4}$alkoxy, and each $R_8$ is, independently, hydrogen or $C_{1-4}$alkyl (preferably methyl).

Where $R_1$ is unsubstituted alkyl radical, such is preferably methyl or ethyl, and when alkyl substituted by hydroxy, the alkyl radical is preferably of 2 or 3 carbon atoms and the hydroxy group preferably in the β-position. The preferred significances of $R_1$ are those set out for $R_1'$, below, particularly those set out for $R_1''$.

Where $R_2$ is unsubstituted alkyl, such is preferably methyl, and when alkyl substituted by hydroxy then the alkyl is preferably of 2 carbon atoms, the hydroxy group being on the β-carbon atom. Where $R_2$ is alkoxy, such is preferably methoxy. The preferred significances of $R_2$ are those set out for $R_2'$, below, particularly those set out for $R_2''$.

By halogen, as used herein, is to be understood chlorine, bromine or fluorine, chlorine, however, being the preferred halogen.

As a first class of particularly preferred compounds may be given the compounds of formula I$a$,

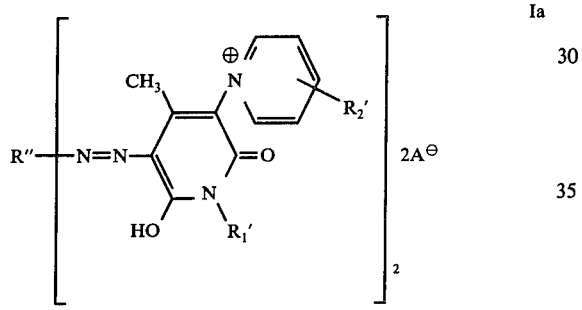

Ia in which $R_1'$ is hydrogen, methyl, ethyl, 2-hydroxyethyl, 2-hydroxypropyl, —N(CH$_3$)$_2$ or —CH(CH$_3$)CH$_2$OH, preferably hydrogen or methyl, $R_2'$ is hydrogen, methyl, methoxy or 2-hydroxyethyl, preferably hydrogen or methyl, and R'' is

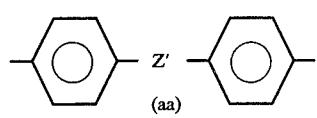

(aa)

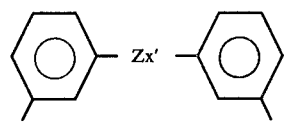

(ab)

or

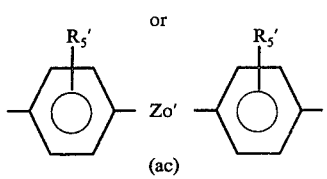

(ac)

where Z' is $Z_5$, $Z_6$, $Z_7$, $Z_{10}$, $Z_{11}$, $Z_{16}$, $Z_{17}$, $Z_{18}$, $Z_{22}$, $Z_{23}$, $Z_{24}$, $Z_{25}$, $Z_{26}$, $Z_{27}$, $Z_{28}$, $Z_{29}$, $Z_{30}$ or $Z_{36}$, as defined above,

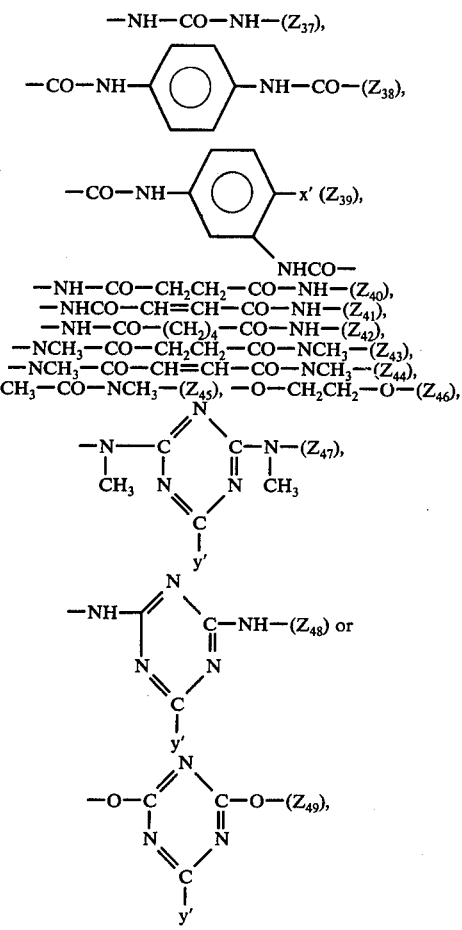

in which x' is hydrogen, chlorine, methyl or methoxy, and y' is chlorine, —NH-CH$_2$CH$_2$OH or —N(CH$_2$CH$_2$OH)$_2$, Zx' is $Z_{11}$, $Z_{16}$, $Z_{40}$ or $Z_{41}$, as defined above, Zo' is $Z_1$, $Z_{35}$ or $Z_{36}$, as defined above, and the $R_5''$s are the same and are chlorine, methyl or methoxy, R'' preferably signifying a radical (aa), where Z' is $Z_{11}$, $Z_{16}$, $Z_{23}$, $Z_{26}$, $Z_{27}$, $Z_{36}$, $Z_{38}$, $Z_{40}$, $Z_{41}$, $Z_{42}$, $Z_{43}$, $Z_{44}$ or $Z_{47}$, preferably $Z_{11}$, $Z_{16}$, $Z_{26}$, $Z_{27}$, $Z_{36}$ or $Z_{38}$.

Of the compounds of formula I$a$, the compounds of formula I$a'$ are preferred,

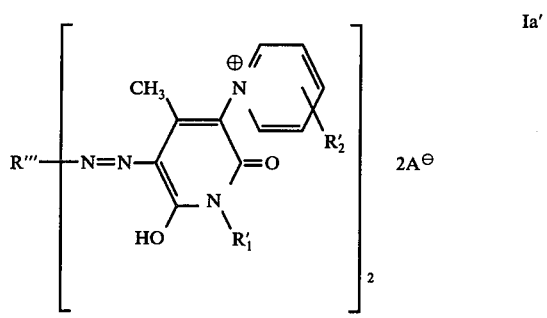

Ia' wherein $R_2'$ and $R_1'$ and the preferred significances thereof are as defined above, and $R'''$ is a radical

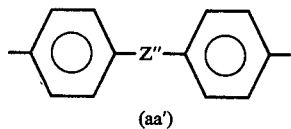
(aa')

where $Z''$ is $Z_{11}, Z_{16}, Z_{23}, Z_{26}, Z_{27}, Z_{36}, Z_{38}, Z_{40}, Z_{41}, Z_{42}, Z_{43}, Z_{44}$ or $Z_{47}$, preferably $Z_{11}, Z_{16}, Z_{26}, Z_{27}, Z_{36}$ or $Z_{38}$, particularly preferred being the compounds of formula Ia'',

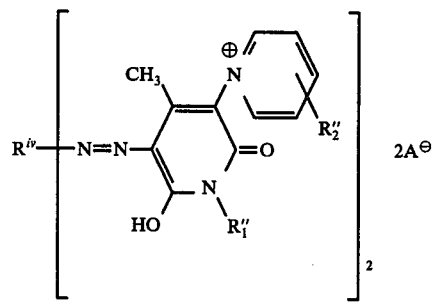
Ia'' wherein $R_1''$ and $R_2''$, independently, are hydrogen or methyl, and $R^{iv}$ is a radical

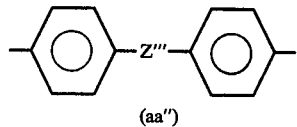
(aa'')

in which $Z'''$ is $Z_{11}, Z_{16}, Z_{26}, Z_{27}, Z_{36}$ or $Z_{38}$, as defined above.

As a second class of particularly preferred compounds may be given the compounds of formula Ib,

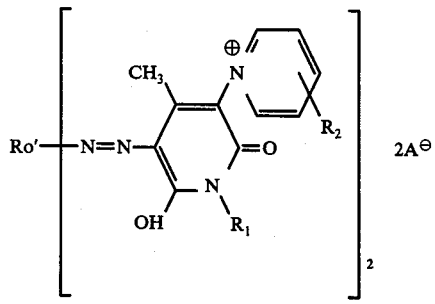
Ib wherein $R_1$ and $R_2$ are as defined above, their significances preferably being those of $R_1'$ and $R_2'$, respectively, and more preferably being those of $R_1''$ and $R_2''$, respectively, and $R_o'$ is a radical

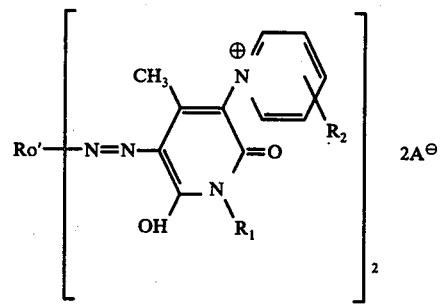
or

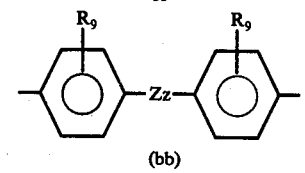
(bb)

where $Z_y$ is $Z_{11}$ or $Z_{14}$, as defined above, $Z_z$ is $Z_1, Z_{35}$ or $Z_{36}$, as defined above, and the $R_9$'s are the same and are hydrogen, chlorine or methyl.

In the compounds of formula Ib, $R_o'$ preferably has the significance $R_o''$, i.e.

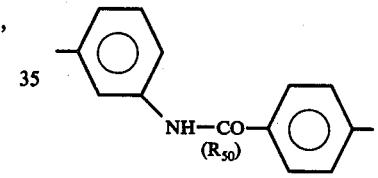
($R_{50}$)

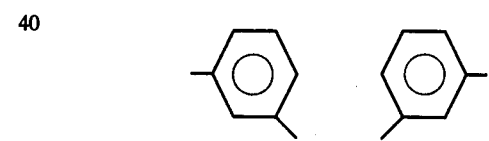
($R_{51}$)

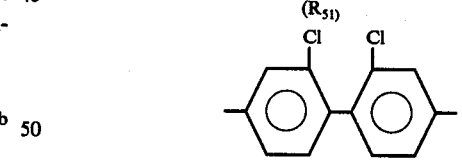
($R_{52}$)

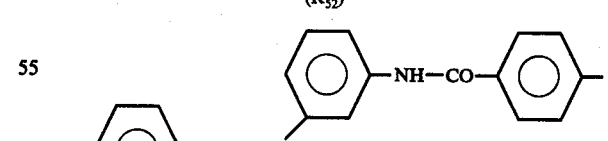
($R_{53}$)

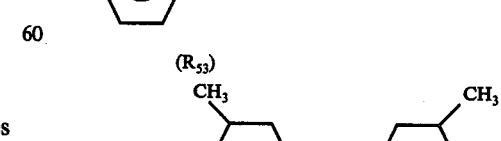
($R_{54}$)

-continued

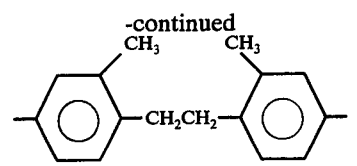

(R₅₅)

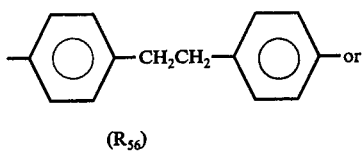 or (R₅₆)

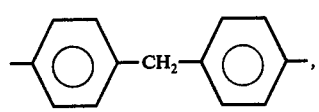, (R₅₇)

more preferably the significance Ro''', i.e. R₅₂, R₅₄, R₅₅, R₅₆ or R₅₇, as defined above, and is most preferably R₅₅, R₅₆ or R₅₇.

Thus, as the preferred compounds of formula Ib may be given the compounds of formula Ib',

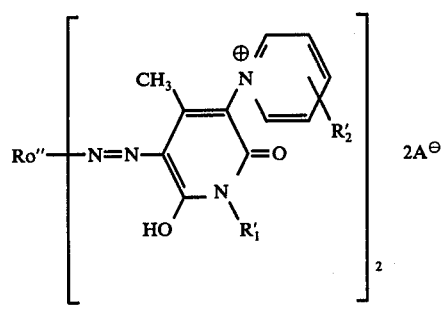   Ib' in which
  $R_1'$ and $R_2'$ and the preferred significances thereof are as defined above, and
  Ro'' is as defined above, it preferably being Ro''' and more preferably being R₅₅, R₅₆ or R₅₇, as defined above,
and as the most preferred compounds of formula Ib may be given the compounds of formula Ib'',

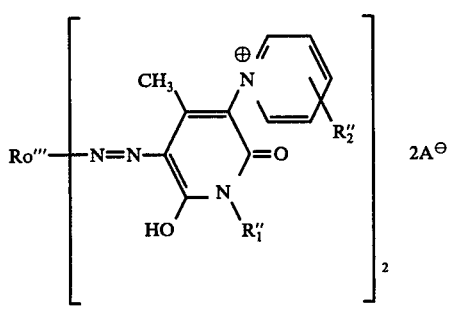   Ib'' in which
  $R_1''$ and $R_2''$ are as defined above, and
  Ro''' is as defined above, preferably being R₅₅, R₅₆ or R₅₇. The preferred compounds of formulae Ib, Ib' and Ib'' are those that are symmetrical.

The exact nature of the anion Z— is not particularly critical, any conventional anion in the basic dyestuffs art being suitable. It is preferably non-chromophoric and may be organic or inorganic. As examples may be given the halides, e.g. chloride or bromide, sulphate, bisulphate, methylsulphate, aminosulphate, perchlorate, propionate, lactate, succinate, benzenesulphonate, oxalate, maleinate, acetate, tartrate, malate, methanesulphonate, tetrafluoroborate, benzoate, complex ions of zinc chloride double salts, and the anions of boric, citric, glycolic, diglycolic and adipic acids.

The invention also provides a process for the production of the compounds of the invention, which process comprises coupling a tetrazo derivative of a diamine, optionally containing an azo linkage, with a 4-methyl-6-hydroxy-3-N-pyridiniumpyridone-2, preferably at a mol ratio of 1:2.

The compounds of formula I may thus be obtained by reacting a tetrazo derivative of a diamine of formula II, $$H_2N — R — NH_2 \quad\quad II$$

with a compound of formula III,

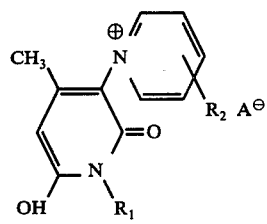   III preferably at a mol ratio of 1:2.

The diazotisation and coupling may be carried out in conventional manner, coupling taking place suitably in aqueous (acidic, neutral or alkaline) or aqueous/organic medium, at a temperature of from —10° C to room temperature, optionally in the presence of a coupling accelerator such as pyridine or urea.

Mixtures of compounds of the invention may be obtained by employing the tetrazo derivative of a mixture of diamines and/or a mixture of the pyridones.

The starting materials for the production of the compounds of the invention are either known or may be obtained from available starting materials in analogous way to the known compounds.

The anion A— desired in the final product may be introduced by incorporation in the pyridone starting material or, if desired, having obtained a compound of the invention having a particular anion A—, this anion may be exchanged for the desired anion in conventional manner, e.g. using an ion exchanger or by reaction with suitable salts, optionally in several stages, e.g. through the hydroxide or bicarbonate.

The dyes provided by the invention may be employed for dyeing basically dyeable substrates and paper.

If desired, the compounds may be converted into dyeing preparations. The processing into stable, liquid dyeing preparations may take place in a generally known manner, advantageously by dissolving them in suitable solvents, optionally adding an aid, e.g. a stabilizer; for example in accordance with the description given in French Patent 1,572,030.

Suitable liquid preparations are obtained, for example, by dissolving 1 part of 100% dyestuff in the form of the dyestuff base in 1 to 6 parts of an organic carboxylic acid or in a mixture of organic carboxylic acids and in 1 to 4 parts of water, but especially by dissolving 1 part of dyestuff in 1.5 to 4 parts of an organic carboxylic acid and in 1.5 to 4 parts of water.

The organic carboxylic acids are understood to be mono-, di- or tri-basic, but advantageously monobasic, low molecular weight carboxylic acids, such as formic acid, acetic acid and propionic acid.

EXAMPLE A OF A LIQUID PREPARATION 160 parts of the dyestuff from Example 1, below, as the dyestuff base are dissolved at 40°–60° C in 300 parts of acetic acid and 320 parts of water. A stable, clear solution is obtained.

The processing into solid, granulated dye preparations may also take place in a generally known manner, advantageously by granulating in accordance with French Patent 1,581,900.

A granulate preparation contains, for example, 1 part of 100% dyestuff, 0.1 to 0.7 parts of an organic carboxylic acid and 0 to 1.5 parts of a solid, non-ionic diluting or standardising agent, preferably 1 part of dyestuff, 0.25 to 0.65 parts of an organic carboxylic acid and 0 to 1.5 parts of diluting or standardising agent.

The organic carboxylic acids for the production of the granulate may be mono-, di- or tribasic, but advantageously mono- or di-basic, low molecular weight, saturated or unsaturated carboxylic acids, optionally containing hydroxyl groups, such as formic acid, acetic acid, propionic acid, oxalic acid, succinic acid, malonic acid, fumaric acid, lactic acid, malic acid, citric acid, etc.

The solid, non-ionic diluting or standardising agent may be, for example, dextrin or sugar, such as glucose, fructose or galactose, etc.

The granulates are advantageously prepared by comminution from solutions or suspensions, e.g. of the following composition:
1 part of dyestuff 100%,
0.1 to 0.7 parts of the organic carboxylic acid,
0 to 1.5 parts of the non-ionic diluting or standardising agent, and
1.5 to 6 parts of water,
or preferably
1 part of dyestuff 100%,
0.5 to 0.65 parts of the organic carboxylic acid,
0 to 1.5 parts of the diluting or standardising agent, and
2 to 4 parts of water.

EXAMPLE B OF A GRANULATE 160 parts of the dyestuff from Example 1, below, as a dyestuff base and 80 parts of dextrin are dissolved at 40°–60° C in 47 parts of lactic acid and 320 parts of water, and the mixture is granulated by known methods.

The new dyestuffs are especially suitable for dyeing paper, e.g. for the production of dyed, sized and unsized paper in the stock. However, they may be used similarly for dyeing sheet paper by the steeping method. Conventional techniques may be used.

The new dyestuffs have good solubility properties, and they are particularly soluble in cold water. Furthermore, in the production of dyed paper, they colour the waste water slightly, if at all. They show low mottling on paper and to a great extent are insensitive to pH. The dyeings on paper are brilliant and hae good light fastness properties. After lengthy exposure to light, the shade changes tone-in-tone. The dyed papers are fast to the wet, not only to water but also to milk, fruit juices and sweetened mineral water, and because of their good fastness to alcohol, they are also resistant to alcoholic drinks. The dyestuffs have a high degree of substantivity, i.e. they are absorbed quantitatively in practice; they may be added to the paper pulp directly, i.e. without previous dissolving, as a dry powder or as a granulate, without reducing the brilliance of the yield of colour. The dyed papers are bleachable both by oxidation and by reduction.

The dyestuffs of formulae $Ia$, $Ia'$ and $Ia''$ are especially suitable for dyeing paper. However, the dyestuffs are also suitable for dyeing, pad-dyeing and printing textile material consisting of acrylonitrile or dicyanoethylene polymers or mixed polymers, or synthetic polyesters which are modified by acid groups, but especially synthetic polyamides which are modified by acid groups, these including in particular the so-called "differential dyeing polyamide," or mixtures of textile material which consists of a predominant portion of the above-mentioned textile materials or contain these. For these dyeings, the dyestuffs of formulae $Ib$, $Ib'$ and $Ib''$ are especially suitable.

The acrylonitrile mixed polymers which are dyed or printed are advantageously copolymers consisting of 80–95% acrylonitrile and 20–5% vinyl acetate, vinyl pyridine, vinyl chloride, vinylidene chloride, acrylic acid, acrylic acid ester, methacrylic acid, methacrylic acid ester or asymmetrical dicyanoethylene.

The polyester material which is dyed or printed is advantageously of the type described in U.S. Pat. No. 3,379,723, e.g. synthetic polyester as obtained by polycondensation of aliphatic or aromatic dicarboxylic acids or their polyester-forming derivatives
 a. with aliphatic or alicyclic diols
 b. and optionally aromatic dihydroxy compounds
 c. and/or their glycol ethers,
with compounds bearing anionic groups.

Polyester material which is modified by anionic groups may also be equally well dyed or printed, e.g. as described in U.S. Pat. No. 3,018,272, in British Patent 1,406,387, in Japanese Published Specification No. 10,497/59.

The polyamide material which is modified by anionic groups is advantageously of the type described in Belgian Patents 549,179 and 706,104, U.S. Pat. Nos. 2,893,816 and 3,890,257 and "Textilveredlung 2" (1967), 11, pages 856-864, so-called Nylon-Dye-Resist types, in "Textilpraxis" 1967, volume 2 (February) pages 737–740, in "Du Pont Preliminary Information" of July 14, 1966 relating to "Type 844 Du Pont BCF Nylon", and Sept. 19, 1966 (Cationic Dyeable Nylon Stable).

Textile material consists of polyacrylonitrile or polyester or polyamide which is modified by anionic groups may be dyed as described in German Published Specification 2,509,095, e.g. by the exhaust method in an aqueous medium, at temperatures of 60°–100° C or at temperatures of above 100° under pressure, whereby the pH may vary within a wide range.

Dyeing or printing may also take place in the presence of usual dyeing aids, e.g. in the presence of condensation products of naphthalene sulphonic acids and formaldehyde, or reaction products of castor oil and ethylene oxide, etc. Printing of the said textile materials takes place by impregnation with a printing paste which contains the dyestuff, water, an organic acid, e.g. acetic acid, formic acid, and a thickener, with subsequent fixation onto the fibres.

The printing paste is applied by stencils or rollers, the print is optionally intermediately dried and the dyestuff is fixed e.g. by steam-treatment at temperatures of about 100° C, and the print is completed.

Fixation of the dyestuff may also take place by the padsteam process or thermasol process, or by the pad-roll process; temperatures of above 200° should, however, be avoided.

The dyestuffs are also suitable for dyeing the said textile materials in the stock, e.g. for gel dyeing by the so-called neocron process, for example in accordance with U.K. Patent 673,738.

Fast, even dyeings with good fastness properties, for example to light, are obtained on the above-mentioned substrates.

The following examples, in which the parts and percentages are by weight and the temperatures in degrees centigrade, illustrate the invention.

EXAMPLE 1

10.6 parts of 4,4'-diaminodibenzyl are dissolved at 0° in 100 parts of water and 31 parts of 30% hydrochloric acid, and they are tetrazotised by known methods with 6.9 parts of sodium nitrite. Subsequently, a solution consisting of 25 parts of 3-pyridinium-4-methyl-6-hydroxypyridone-2-chloride and 100 parts of water is added in drops to the ice-cold diazo solution, and at the same time 15 parts of cyrstalline sodium acetate are sprinkled in in portions. After coupling, the reaction mixture is treated with hydrochloric acid, whereby the dyestuff is precipitated. The dyestuff is filtered off. When dried and ground, a hydro-soluble powder is obtained, which dyes paper in yellow shades. The dyestuff corresponds to the formula

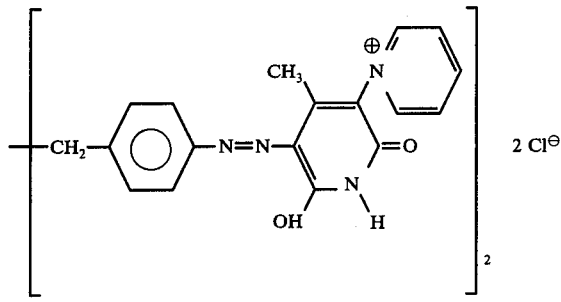

DYEING FORMULA A 70 parts of chemically bleached sulphite cellulose (from conifer wood) and 30 parts of chemically bleached sulphite cellulose (from birchwood) are ground in 2000 parts of water in a Hollander. 0.2 parts of the dyestuff described in Example 1 are sprinkled into this pulp. After mixing for 20 minutes, paper is produced from this pulp. The absorbent paper obtained in this way is dyed yellow. The waste water is practically colourless.

DYEING FORMULA B 0.5 parts of the dyestuff from Example 1 are dissolved in 100 parts of hot water and cooled to room temperature. This solution is added to 100 parts of chemically bleached sulphite cellulose which has been ground with 2000 parts of water in a Hollander. After mixing thoroughly for 15 minutes, sizing takes place. Paper produced from this pulp has a yellow shade of average intensity, and has good wet fastness properties.

DYEING FORMULA C

An absorbent strip of unsized paper is drawn through a dyestuff solution of the following composition at 40–50°:
   0.5 parts of the dyestuff of Example 1,
   0.5 parts of starch and
   99.0 parts of water.

The excess dyestuff solution is pressed out through two rollers. The dried strip of paper is dyed yellow. Equally good paper dyeings are obtained if equivalent amounts accorrding to example a (liquid preparation) or examle b (granulate preparation) are added to the above dyeing formulae A, B and C.

EXAMPLE 2

20 parts of the dyestuff of the formula

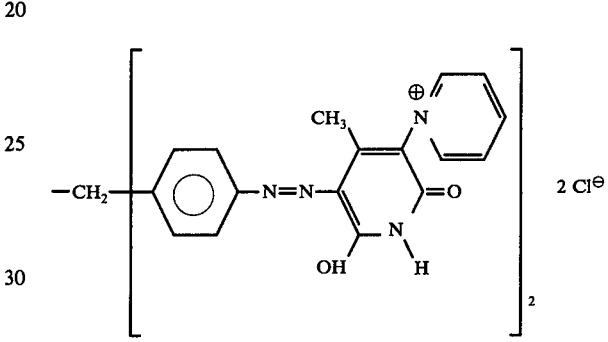

and 80 parts of dextrin are ground for 4 hours in a powder mill. The same dyestuff mixture may be obtained by making a paste with 100 parts of water, with subsequent spray-drying.

1. part of the preparation thus obtained is made into a paste with 1 part of 40% acetic acid, the paste is covered with 200 parts of demineralised water and boiled for a short time. It is diluted with 7000 parts of demineralised water, then 2 parts of glacial acetic acid are added and it is entered into the bath at 60° with 100 parts of polyacrylonitrile fabric. The material may previously be pretreated for 10–15 minutes at 60° in a bath consisting of 8000 parts of water and 2 parts of glacial acetic acid.

It is heated over the course of 30 minutes to 98°–100° C, boiled for 1½ hours and rinsed. A yellow dyeing with good light fastness and good wet fastness properties is obtained. The dyestuff may be obtained similarly to Example 1 by using an equivalent amount of 4,4'-diaminodiphenylmethane instead of 4,4'-diaminodibenzyl.

EXAMPLE 3

20 parts of the dyestuff given in Example 2 are mixed with 80 parts of dextrin in a ball mill for 48 hours.

1 part of the preparation thus obtained is made into a paste with 1 part of 40% acetic acid, the paste is covered with 200 parts of demineralised water and boiled for a short time. Dyeing takes place as follows using this stock solution:

a. It is diluted with 7000 parts of demineralised water, then 21 parts of calcined sodium sulphate are added, as well as 14 parts of ammonium sulphate, 14 parts of formic acid and 15 parts of a carrier based on the reaction products of ethylene oxide with dichlorophenols, and it is entered into the bath at 60° with 100 parts of polyester fabric which is modified by acid groups. The material may previously be pretreated for 10-15 minutes at 60° in a bath consisting of 8000 parts of water and 2 parts of glacial acetic acid.

It is heated over the course of 30 minutes to 98°-100°, boiled for one hour and rinsed. An even, yellow dyeing is obtained, with good fastness properties, for example to light and to the wet.

b. It is diluted with 3000 parts of demineralised water, then 18 parts of calcined sodium sulphate are added, as well as 6 parts each ammonium sulphate and formic acid, and it is entered into the bath at 60° with 100 parts of polyester fabric which is modified by acid groups. It is heated in a closed container over the course of 45 minutes to 110°, kept at this temperature with shaking for 1 hour, then cooled over the course of 25 minutes to 60°, and the dyed matter is rinsed.

An even, fast, yellow dyeing with good wet fastness properties is obtained.

EXAMPLE 4

20 parts of the dyestuff mentioned in Example 2 are mixed with 80 parts of dextrin in a ball mill for 48 hours. 1 part of the preparation thus obtained is made into a paste with 1 part of 40% acetic acid, the paste is covered with 200 parts of demineralised water and boiled for a short time. This solution is added to the dye liquor which is prepared as follows:

The solution is diluted with 7000 parts of demineralised water, then 21 parts of calcined sodium sulphate are added, as well as 14 parts of ammonium sulphate, 14 parts of formic acid and 15 parts of a carrier based on the reaction products of ethylene oxide with dichlorophenols, and the liquor is buffered with an acid buffering solution to a pH of 6, and then entered at 25° into the batch with 100 parts of polyamide fabric which is modified by anionic groups, the bath having a liquor ratio of 1:80. The bath is heated over the course of 45 minutes to 98°, boiled for one hour and rinsed in running water at 70°-80° and then in cold water. In order to be dried, the fabric may be centrifuged and subseqently ironed. A yellow dyeing with good fastness properties is obtained.

EXAMPLE 5

A printing paste is prepared as follows:

1 part of the dyestuff from Example 2 is made into a paste with 30 parts of acetic acid and is covered with 280 parts of boiling water. 50 parts of benzyl alcohol are added to the solution obtained, as well as 500 parts of a thickener based on carboxymethyl cellulose which has been soaked in water in a ratio of 1:4, and 10 parts of a swelling agent.

A polyacrylonitrile fabric or a polyester or polyamide fabric which is modified by acid groups is printed in known manner with this printing paste. The prints are dried and steamed in an autoclave at 110° for 30 minutes at 1.8 atmospheres; the steam-treatment may also take place continuously for 5 to 30 minutes. After rinsing with cold water, any dyestuff which has not been fixed is removed by washing for 5 minutes at 70° with a 0.1% soap solution; it is subsequently rinsed again with cold water and the print is dried in known manner. A fast, even, yellow print with good fastness properties is obtained.

So-called "differential dyeing polyamide" material of the types 844, 845, 846 or 847 of Du Pont are advantageously dyed in accordance with Example 4.

In the following table I is given the structure of further dyestuffs which may be produced in accordance with the description given in Example 1. They correspond to the formula

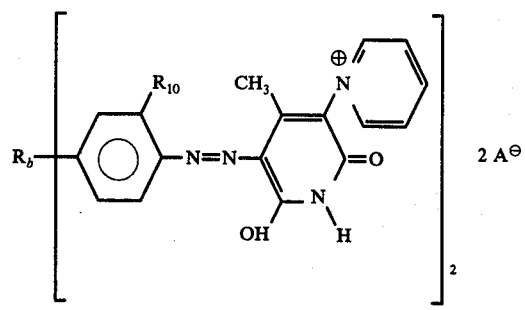

wherein $R_b$ and $R_{10}$ are as given in the table. The anion $A^-$ may be those listed in the description.

Table I

| Ex. No. | $R_b$ | $R_{10}$ |
|---|---|---|
| 6 | —NH—CO—NH— | H |
| 7 | —NH—CO— | H |
| 8 | —NH— | H |
| 9 | —CH$_2$— | —CH$_3$ |
| 10 | —CH(C$_6$H$_{11}$)— | H |
| 11 | —S— | H |
| 12 | direct bond | H |
| 13 | " | OCH$_3$ |
| 14 | —CO—NH—C$_6$H$_4$—NH—CO— | H |
| 15 | —S—S— | H |
| 16 | —CH$_2$—CH$_2$— | OCH$_3$ |
| 17 | —CO— | H |
| 18 | —NH—CS—NH— | H |
| 19 | —O— | H |
| 20 | —CH=CH— | H |
| 21 | —SO$_2$— | H |
| 22 | —NH—C(triazine-N(CH$_2$CH$_2$OH)$_2$)—NH— | H |
| 23 | —CH$_2$—CH$_2$— | Cl |
| 24 | —CH$_2$—CH$_2$— | CH$_3$ |
| 25 | —CH$_2$—CH$_2$— | OCH$_3$ |
| 26 | direct bond | Cl |
| 27 | —NH—CO—CH$_2$—CH$_2$—CO—NH— | H |
| 28 | —NH—CO—CH=CH—CO—NH— | H |
| 29 | —O—C(=O)—N(CH$_2$CH$_2$)N—C(=O)—O— | H |
| 30 | —C(=N—N=)C—O (oxadiazole) | H |
| 31 | —NH—CO—C$_6$H$_4$—CO—NH— | H |
| 32 | —SO$_2$—NH— | H |
| 33 | —SO$_2$—NH—C$_6$H$_4$—NH—SO$_2$— | H |

Table I-continued

| Ex. No. | $R_b$ | $R_{10}$ |
|---|---|---|
| 34 | —NH—CO—(CH$_2$)$_4$—CO—NH— | H |
| 35 | —N(CH$_3$)—CO—CH$_2$—CH$_2$—CO—N(CH$_3$)— | H |
| 36 | —N(CH$_3$)—CO—CH=CH—CO—N(CH$_3$)— | H |
| 37 | —N(CH$_3$)—C(O)—N(CH$_3$)— | H |
| 38 | —CO—NH—NH—CO— | H |
| 39 | —CH$_2$—CO—NH—NH—CO—CH$_2$— | H |
| 40 | —CH=CH—CO—NH—NH—CO—CH=CH— | H |
| 41 | —N(CH$_2$CH$_2$)$_2$N— (piperazine) | H |
| 42 | triazine bridge with two —N(CH$_3$)— and HNCH$_2$—CH$_2$—OH | H |
| 43 | triazine bridge —NH—...—NH— with Cl and N-triazinyl-Cl substituent | H |
| 44 | pyrimidine bridge —O—C...C—O— with Cl substituents | H |
| 45 | triazine bridge —O—C...C—O— with N(CH$_2$—CH$_2$OH)$_2$ | H |
| 46 | —O—CO—O— | H |
| 47 | —CO—O— | H |
| 48 | —O—CH$_2$—CH$_2$—O— | H |

In the following table II is given the structure of further dyestuffs which may be produced in accordance with the description in Example 1. They correspond to the formula

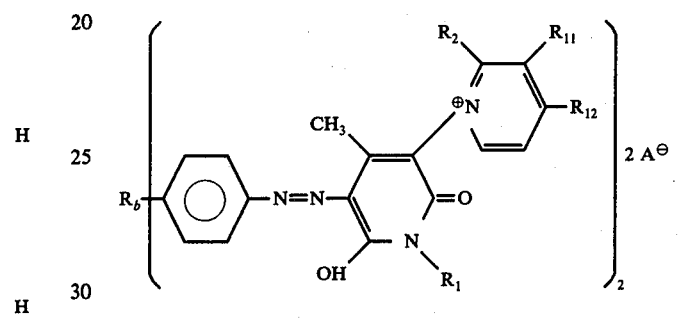

wherein $R_b$, $R_1$, $R_2$, $R_{11}$ and $R_{12}$ are as given in the table. The anion $A^-$ may be those listed in the description.

Table II

| Ex. No. | $R_b$ | $R_1$ | $R_2$ | $R_{11}$ | $R_{12}$ |
|---|---|---|---|---|---|
| 49 | —CH$_2$—CH$_2$— | H | —CH$_3$ | H | H |
| 50 | " | H | H | —CH$_3$ | H |
| 51 | " | H | H | —C$_2$H$_4$—OH | H |
| 52 | " | H | —C$_2$H$_4$—OH | H | H |
| 53 | " | H | —OCH$_3$ | H | H |
| 54 | " | H | H | H | —CH$_3$ |
| 55 | " | —CH$_3$ | H | H | H |
| 56 | " | —N(CH$_3$)$_2$ | H | H | H |
| 57 | " | —C$_2$H$_4$—OH | H | H | H |
| 58 | " | —CH$_2$—CHOH—CH$_3$ | H | H | H |
| 59 | " | —CH(CH$_3$)CH$_2$OH | H | H | H |
| 60 | —NH—CO— | H | —CH$_3$ | H | H |
| 61 | " | H | H | —CH$_3$ | H |
| 62 | " | H | H | —C$_2$H$_4$OH | H |
| 63 | " | H | —C$_2$H$_4$—OH | H | H |
| 64 | " | H | —OCH$_3$ | H | H |
| 65 | " | H | H | H | —CH$_3$ |
| 66 | " | —CH$_3$ | H | H | H |
| 67 | " | —N(CH$_3$)$_2$ | H | H | H |
| 68 | " | —C$_2$H$_4$—OH | H | H | H |
| 69 | " | —CH$_2$—CHOH—CH$_3$ | H | H | H |
| 70 | " | —CH(CH$_3$)CH$_2$—OH | H | H | H |
| 71 | —NH—CO—CH$_2$—CH$_2$—CO—NH— | —CH$_3$ | H | H | H |
| 72 | " | —C$_2$H$_4$OH | —CH$_3$ | H | H |
| 73 | " | —CH(CH$_3$)CH$_2$OH | H | H | H |
| 74 | " | —CH$_3$ | H | CH$_3$ | H |

Table II-continued

| Ex. No. | $R_b$ | $R_1$ | $R_2$ | $R_{11}$ | $R_{12}$ |
|---|---|---|---|---|---|
| 75 | direct bond | H | $CH_3$ | H | H |
| 76 | —NH—CO—CH=CH—CO—NH— | $CH_3$ | $CH_3$ | H | H |
| 77 | —O—CO—N(CH$_2$CH$_2$)$_2$N—CO—O— | H | $CH_3$ | H | H |
| 78 | —C(=N—N=)C—O— (oxadiazole) | H | $CH_3$ | H | H |
| 79 | —NH—CO—C$_6$H$_4$—CO—NH— | $CH_3$ | $CH_3$ | H | H |
| 80 | —SO$_2$—NH— | H | H | $CH_3$ | H |
| 81 | —SO$_2$—NH—C$_6$H$_4$—NH—SO$_2$— | H | H | H | $CH_3$ |
| 82 | —NH—CO—(CH$_2$)$_4$—CO—NH— | H | H | $CH_3$ | H |
| 83 | —N(CH$_3$)—CO—CH$_2$—CH$_2$—CO—N(CH$_3$)— | $CH_3$ | $CH_3$ | H | H |
| 84 | —N(CH$_3$)—CO—CH=CH—CO—N(CH$_3$)— | —C$_2$H$_4$OH | $CH_3$ | H | H |
| 85 | —N(CH$_3$)—CO—N(CH$_3$)— | —N(CH$_3$)$_2$ | $CH_3$ | H | H |
| 86 | —CO—NH—NH—CO— | H | $CH_3$ | H | H |
| 87 | —CH$_2$—CO—NH—NH—CO—CH$_2$— | H | $CH_3$ | H | H |
| 88 | —CH=CH—CO—NH—NH—CO—CH=CH— | H | H | $CH_3$ | H |
| 89 | —N(CH$_2$CH$_2$)$_2$N— (piperazine) | —CH$_2$—CHOH—CH$_3$ | $CH_3$ | H | H |
| 90 | —O—CO—O— | H | $CH_3$ | H | H |
| 91 | —CO—O— | H | $CH_3$ | H | H |
| 92 | —CO—CO— | H | $CH_3$ | H | H |
| 93 | —O—CH$_2$—CH$_2$—O— | H | $CH_3$ | H | H |
| 94 | —N(CH$_3$)—C(triazine with N(CH$_2$CH$_2$—OH)$_2$)—N(CH$_3$)— | H | $CH_3$ | H | H |
| 95 | —O—C(=N—C(Cl)=N—)C—O— | H | $CH_3$ | H | H |

The dyestuffs listed in the following may be produced in accordance with Example 1 and correspond to the formulae

EXAMPLE 96

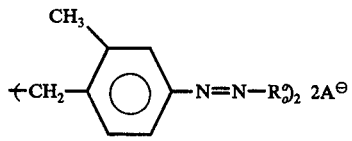

EXAMPLE 97

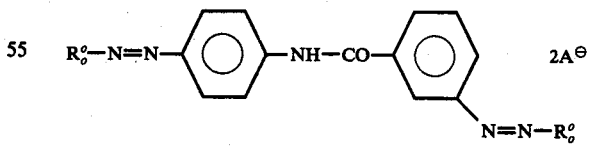

EXAMPLE 98

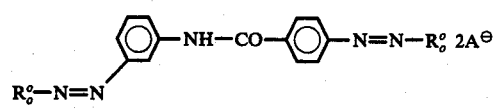

EXAMPLE 99

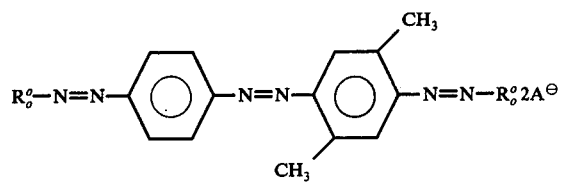

EXAMPLE 100

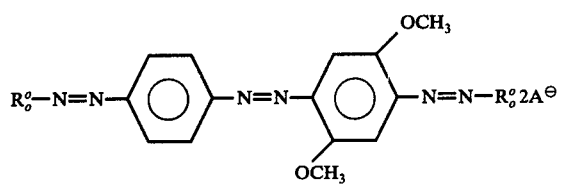

EXAMLE 101

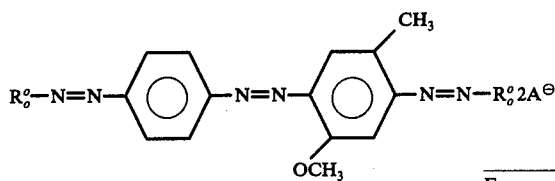

EXAMPLE 102

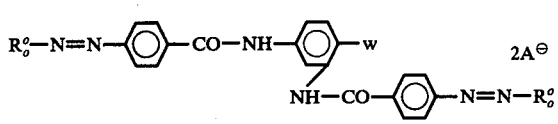

wherein w signifies H, Cl, CH$_3$ or OCH$_3$;

EXAMPLE 103

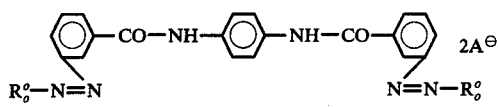

wherein R$_o^o$ signifies a radical of the formula

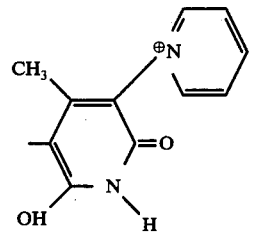

In the following table III is given the structure of further dyestuffs which may be produced in accordance with Example 1. They correspond to the formula

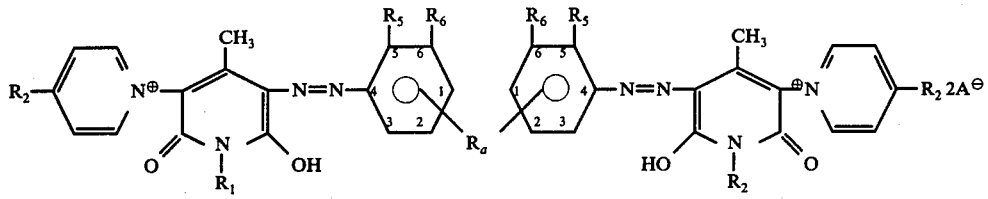

wherein R$_a$, R$_1$, R$_2$, R$_5$ and R$_6$ are as given in table III.

In the R$_a$ column is given the position of the bond with the adjacent aromatic rings.

The anion A$^-$ may be those listed in the description.

| Ex. No. | R$_a$ | R$_1$ | R$_2$ | R$_5$ | R$_6$ |
|---|---|---|---|---|---|
| 104 | —CH$_2$—(1,1) | H | H | H | H |
| 105 | —CH$_2$—CH$_2$—(1,1) | H | H | H | H |
| 106 | —CH$_2$—(1,1) | H | H | CH$_3$ | H |
| 107 | direct bond | H | H | H | Cl |
| 108 | —CH$_2$—(1,1) | H | CH$_3$ | H | H |
| 109 | —CH$_2$—CH$_2$—(1,1) | H | CH$_3$ | H | H |
| 110 | —CH$_2$—(1,1) | C$_2$H$_5$ | H | H | H |
| 111 | " | CH$_3$ | H | H | H |
| 112 | —CH$_2$—CH$_2$—(1,1) | C$_2$H$_5$ | H | H | H |
| 113 | " | CH$_3$ | H | H | H |
| 114 | —HN—CO—(2,1) | H | H | H | H |
| 115 | —HN—CO—(2,2) | H | H | H | H |
| 116 | —CO—NH—⌬—NH—CO-(1,1) | H | H | H | H |

The dyestuffs of Examples 9, 10, 14, 15, 17, 19, 21, 24–59, 71–96, 98, 102 and 103 due paper in yellow shades; the dyestuffs of Examples 7, 11, 16, 22, 23, 60–70 and 97 dye paper in orange shades; the dyestuffs of Examples 6, 12, 18 dye paper in red shades; the dyestuffs of Examples 13, 20, 99–101 dye paper in violet shades and the dyestuff of Example 8 dyes paper in blue shades. The dyestuffs of Examples 104 to 116 dye polyacrylonitrile material or polyamide material which is modified by acid groups in yellow shades.

What is claimed is:

1. A process for dyeing or printing a basic dyeable textile substrate comprising applying to a basic dyeable textile substrate, as a dyeing or printing agent, a bicationic disazo or trisazo dye containing 6-hydroxy-4-methyl-3-N-pyridinium or substituted pyridinium-pyrid-2-one-5 terminal coupling component radicals, the 1-position of each of which is independently unsubstituted or substituted, said dye being free of sulfo groups.

2. A process according to claim 1 wherein said basic dyeable textile substrate consists of or comprises a polymer or mixed polymer of acrylonitrile or dicyanoethylene, a synthetic polyester modified by acid groups, a polyamide modified by acid groups or a differential dyeing polyamide.

3. A process according to claim 2 wherein said basic dyeable textile substrate consists of or comprises a polyamide modified by acid groups or a differential dyeing polyamide.

4. A process according to claim 2 wherein said basic dyeable textile substrate consists of or comprises a polymer of acrylonitrile or a mixed polymer of 80-95% acrylonitrile and 5-20% vinyl acetate, vinylpridine, vinyl chloride, vinylidene chloride, acrylic acid, an acrylic acid ester, methacrylic acid, a methacrylic acid ester or asymmetrical dicyanoethylene.

5. A process according to claim 1 wherein said bicationic disazo or trisazo dye contains 6-hydroxy-4-methyl-3-[N-pyridinium, N-(n-$C_{1-4}$alkyl)pyridinium, N-(n-$C_{1-4}$hydroxyalkyl)pyridinium or N-($C_{1-4}$alkoxy)-pyridinium]-pyrid-2-one-5 terminal coupling component radicals, the 1-position of each of which is independently unsubstituted or substituted by $C_{1-4}$alkyl, $C_{1-4}$hydroxyalkyl or —$NR_3R_4$, wherein each of $R_3$ and $R_4$ is independently n-$C_{1-4}$alkyl.

6. A process according to claim 5 wherein said dye is a dye of the formula

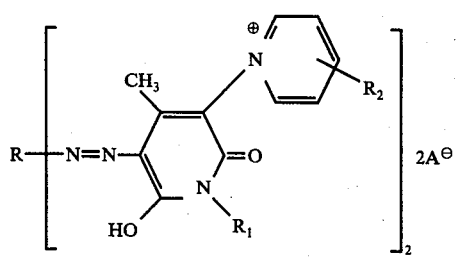

wherein
R is the radical of a tetrazotizable diamino compound,
each $R_1$ is independently hydrogen, $C_{1-4}$alkyl, $C_{1-4}$hydroxyalkyl or —$NR_3R_4$,
wherein
each of $R_3$ and $R_4$ is independently n-$C_{1-4}$alkyl,
each $R_2$ is independently hydrogen, n-$C_{1-4}$alkyl, n-$C_{1-4}$hydroxyalkyl or $C_{1-4}$alkoxy, and
each $A^-$ is an anion.

7. A process according to claim 6 wherein said dye is a dye of the formula

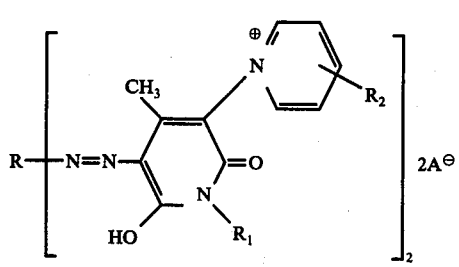

wherein R is 1,4-phenylene, 2,7-fluorenylene,

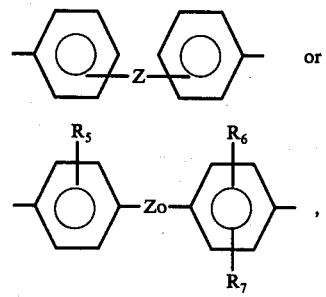 or

, wherein Z is a direct bond, straight or branched $C_{1-6}$alkylene, —CO—, —NHCSNH—, —S—, —O—,
—CH=CH—, —S—S—, —$SO_2$—, —NH—, —NH—CO—, —$NCH_3$—CO—, , —CO—NH——NH—CO—, —CO—NH—$_x$,—NH—CO——NH—$SO_2$—, —$SO_2$NH—, —$SO_2$NH——NH—$SO_2$—, —$NR_8$—CO—$(CH_2)_n$—CO—$NR_8$—,
—$NR_8$—CO—CH=CH—CO—$NR_8$—, —$NR_8$—CO—$NR_8$—,
—CO—NH—NH—CO—, —$CH_2$—CO—NH—NH—CO—$CH_2$—,
—CH=CH—CO—NH—NH—CO—CH=CH—,

,

, —O—CO—O—, —CO—O—, —CO—CO—,

—O—$(CH_2)_n$—O—, —$NR_8$——$NR_8$— or wherein
each $R_8$ is independently hydrogen or $C_{1-4}$alkyl, $x$ is halo, $C_{1-4}$alkyl or $C_{1-4}$alkoxy, $y$ is halo, —NHCH$_2$CH$_2$OH or —N(CH$_2$CH$_2$OH)$_2$, and $n$ is 1, 2, 3 or 4, with the proviso that Z is meta or para to each —N=N— linkage, Zo is a direct bond, —N=N—, —CH$_2$— or —CH$_2$CH$_2$—, $R_5$ is hydrogen, halo, $C_{1-4}$alkyl or $C_{1-4}$alkoxy, $R_6$ is halo, $C_{1-4}$alkyl or $C_{1-4}$alkoxy, and $R_7$ is hydrogen, $C_{1-4}$alkyl or $C_{1-4}$alkoxy, each $R_1$ is independently hydrogen, $C_{1-4}$alkyl, $C_{1-4}$hydroxyalkyl or —NR$_3$R$_4$, wherein each of $R_3$ and $R_4$ is independently n—$C_{1-4}$alkyl, each $R_2$ is independently hydrogen, n—$C_{1-4}$alkyl, n—$C_{1-4}$hydroxyalkyl or $C_{1-4}$alkoxy, and each A$^-$ is an anion, wherein each halo is independently fluoro, chloro or bromo.

8. A process according to claim 7 wherein each A$^-$ is a non-chromophoric anion.

9. A process according to claim 7
wherein
the two $R_1$'s are identical, and
the two $R_2$'s are identical.

10. A process according to claim 8 wherein said dye is a dye of the formula

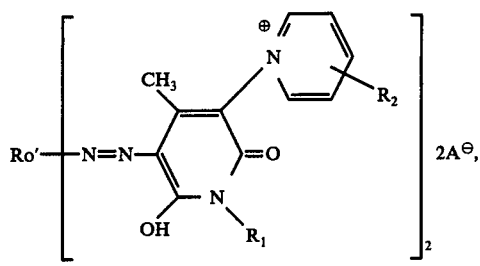

wherein Ro' is

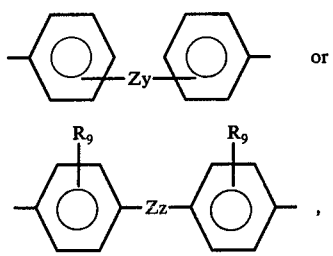

wherein
Zy is —NH—CO— or

with the proviso that Zy is meta or para to each —N=N— linkage,

Zz is a direct bond, —CH$_2$— or —CH$_2$CH$_2$—, and each $R_9$ is hydrogen, chloro or methyl, with the proviso that the two $R_9$'s are identical, each $R_1$ is independently hydrogen, $C_{1-4}$alkyl, $C_{1-4}$hydroxyalkyl or —NR$_3$R$_4$, wherein
each of $R_3$ and $R_4$ is independently n-$C_{1-4}$alkyl, each $R_2$ is independently hydrogen, n-$C_{1-4}$alkyl, n-$C_{1-4}$hydroxyalkyl or $C_{1-4}$alkoxy, and each A$^-$ is an anion.

11. A process according to claim 10
wherein
the two $R_1$'s are identical, and
the two $R_2$'s are identical.

12. A process according to claim 10 wherein Ro' is

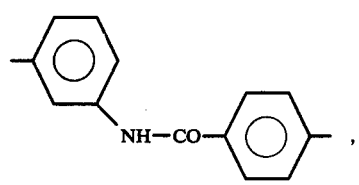

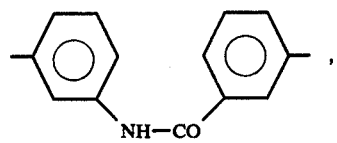

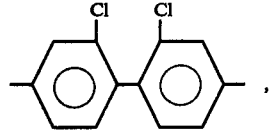

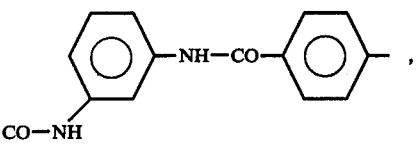

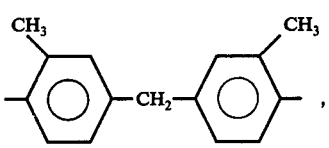

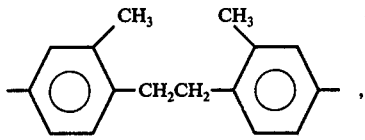

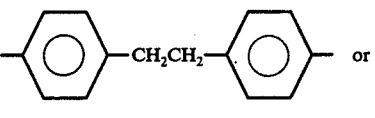

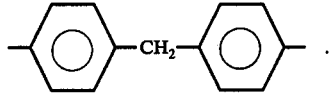

13. A process according to claim 12 wherein said dye is a dye of the formula

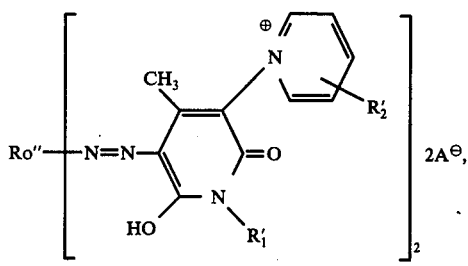

wherein Ro'' is

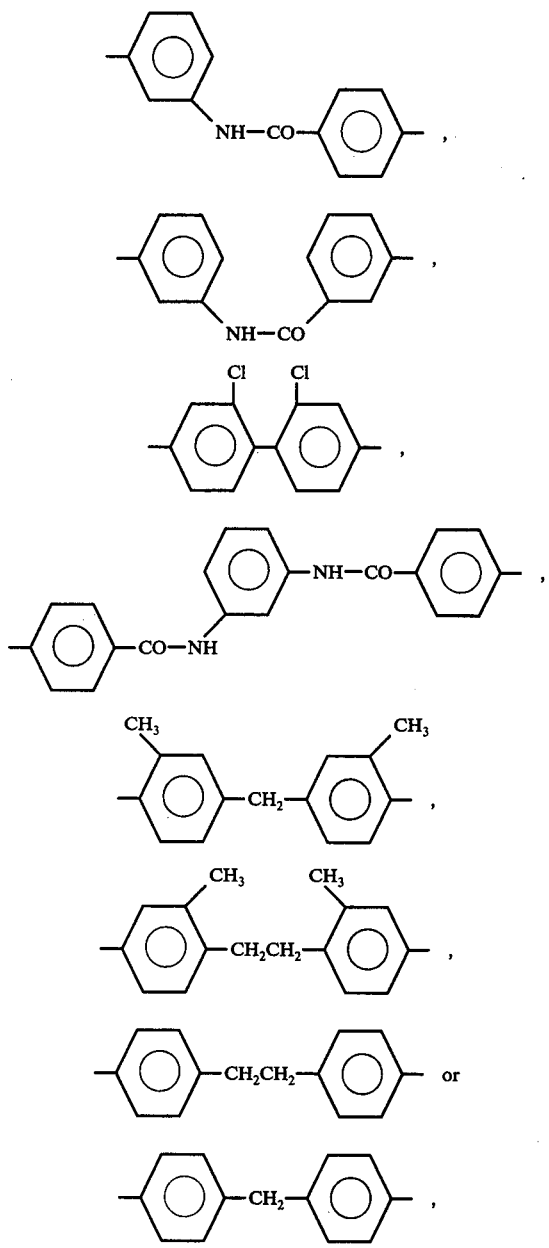

each $R_1'$ is independently hydrogen, methyl, ethyl, 2-hydroxyethyl, 2-hydroxypropyl, 2-hydroxy-1-methylethyl or dimethylamino,
each $R_2'$ is independently hydrogen, methyl, methoxy or 2-hydroxyethyl, and
each $A^-$ is an anion.

14. A process according to claim 13 wherein
the two $R_1''$'s are identical, and
the two $R_2''$'s are identical.

15. A process according to claim 13 wherein Ro'' is

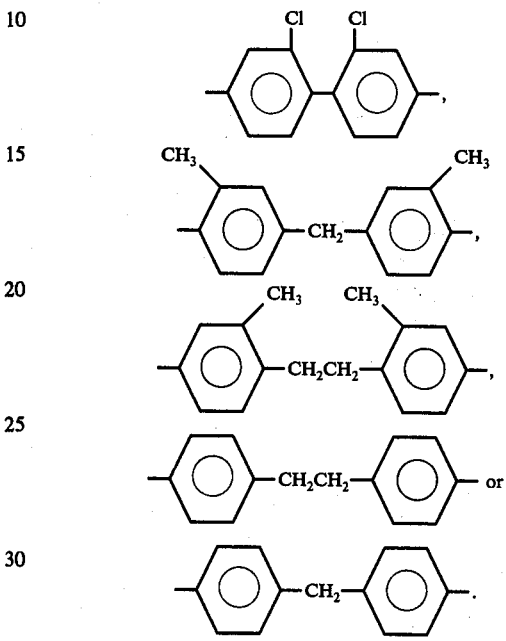

16. A process according to claim 15 wherein Ro'' is

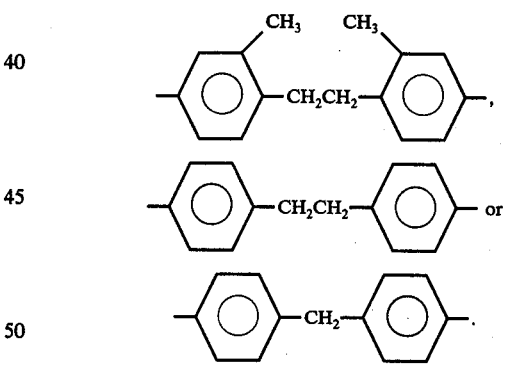

17. A process according to claim 15 wherein said dye is a dye of the formula

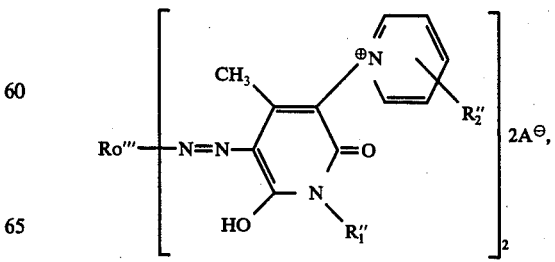

wherein Ro''' is

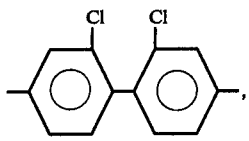
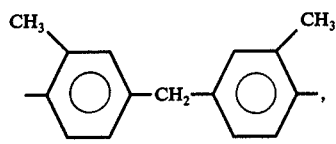
-continued
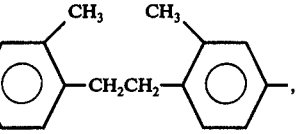
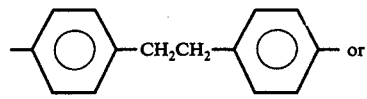
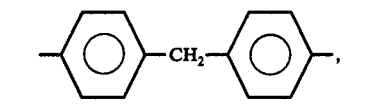
each $R_1''$ and $R_2''$ is independently hydrogen or methyl, and each $A-$ is an anion.
18. A process according to claim 17 wherein
the two $R_1'''$s are identical, and
the two $R_2'''$s are identical.
* * * * *